United States Patent [19]

Audesse et al.

[11] 4,164,007
[45] Aug. 7, 1979

[54] MULTILAMP PHOTOFLASH UNIT

[75] Inventors: Emery G. Audesse, Beverly, Mass.; Donald W. Hartman, Williamsport, Pa.

[73] Assignee: GTE Sylvania Incorporated, Stamford, Conn.

[21] Appl. No.: 840,497

[22] Filed: Oct. 7, 1977

[51] Int. Cl.² .................................. G03B 15/02
[52] U.S. Cl. ............................. 362/13; 362/252
[58] Field of Search .............. 362/3, 11, 13, 14, 15, 362/5, 16, 10, 140, 187, 227, 800, 4, 235, 240, 241, 247, 252

[56] References Cited

U.S. PATENT DOCUMENTS

| | | | |
|---|---|---|---|
| 2,892,076 | 6/1959 | Moos | 362/247 |
| 3,614,412 | 10/1971 | Bellows | 362/13 |
| 4,059,387 | 11/1977 | Witterick et al. | 362/11 X |

Primary Examiner—William M. Shoop
Assistant Examiner—Peter S. Wong
Attorney, Agent, or Firm—Edward J. Coleman

[57] ABSTRACT

A compact photoflash unit is provided for arranging more lamps in a given volume while maintaining performance requirements. Two parallel columns of horizontally disposed lamps are mounted in a planar array with the lamps of one column staggered with respect to the other with the bases interdigitated. A multiple reflector system for the lamps comprises a pair of adjacent strip-like reflector panels each having a column of side-by-side reflector cavities aligned with an associated column of lamps, the cavities of one panel being staggered with respect to the cavities of the other. Each panel is foreshortened with respect to its associated lamps and covers the lead-in wires and bases of the lamps associated with the adjacent panel.

8 Claims, 6 Drawing Figures

1

MULTILAMP PHOTOFLASH UNIT

CROSS-REFERENCE TO RELATED APPLICATION

Ser. No. 840,498, filed concurrently herewith, Donald E. Armstrong, "Multilamp Photoflash Unit", assigned the same as this invention.

BACKGROUND OF THE INVENTION

The present invention relates to multilamp photoflash units and, more particularly, to the efficient arrangement of photoflash lamps and reflectors in a planar array.

Numerous multilamp arrangements with various types of sequencing circuits have been described in the prior art; particularly, in the past few years. A currently marketed photoflash unit (described in U.S. Pat. Nos. 3,894,226; 3,912,442; 3,935,442; 3,937,946; 3,941,992; 3,952,320 and 4,017,728 and referred to as a flip flash) employs high-voltage type lamps adapted to be ignited sequentially by successively applied high-voltage firing pulses from a source such as a camera-shutter-actuated piezoelectric element. The flip flash unit comprises an elongated planar array of eight high-voltage type flashlamps mounted on a printed circuit board with an array of respectively associated reflectors disposed therebetween. The lamps are arranged in two groups of four disposed on the upper and lower halves respectively of the rectangular-shaped circuit board. A set of terminal contacts at the lower end of the unit is provided for activation of the upper group of lamps, while a set of terminal contacts at the top of the unit is operatively associated with the lower group of four lamps. The application of successive high-voltage pulses (e.g. 500 to 4,000 volts from, say, piezoelectric source controlled by the shutter of a camera in which the array is inserted) to the terminal contacts at the lower end of the unit causes the four lamps at the upper half of the array to be sequentially ignited. The array may then be turned end for end and again inserted into the camera in order to flash the remaining four lamps.

The flip flash circuit board comprises an insulating sheet of plastic having a pattern of conductive circuit traces, including the terminal contacts, on one side. The flashlamp leads are electrically connected to these circuit traces by means of eyelets secured to the circuit board and crimped to the lead wires. The circuitry on the board includes six printed, normally open, connect switches that chemically change from a high to lower resistance, so as to become electrically conducting after exposure to the radiant heat energy from an ignited flashlamp operatively associated therewith. The purpose of these switches is to provide lamp sequencing and one-at-a-time flashing. The four lamps of each group are arranged in parallel with three of the four lamps being connected in series with their respective thermal connect switches. Initially, only the first of the group of four lamps is connected directly to the voltage pulse source. When this first group flashes, it causes its associated thermal connected switch (which is series connected with the next or second lamp) to become permanently conductive. Because of this action, the second lamp of the group of four is connected to the pulse source. This sequence of events is repeated until all four lamps have been flashed.

The overall construction of the flip flash unit comprises front and back plastic housing members with interlocking means for providing a unitary structure. The front housing member is a rectangular concavity and the back housing is substantially flat. Sandwiched between the front and back housing members, in the order named, are the flashlamps, a unitary reflector member, preferably of aluminum-coated plastic, shaped to provide the eight individual reflectors of the array, an insulating sheet, the printed circuit board, and an indicia sheet, which is provided with information, trademarks, and flash indicators located behind the respective lamps and which change color due to heat and or light radiation from a flashing lamp, thus indicating at a glance which of the lamps have been flashed and not flashed.

The production of compact photoflash arrays, such as the flip flash described above, has forced lamp manufacturers to use stronger, hard glass vessels, such as those of borosilicate glass (e.g., see U.S. Pat. No. 3,506,385), to contain the higher internal loadings of oxygen and filamentary combustible material which are needed to provide a required light output in specific reflector embodiments, along with product safety. For example, in a present flip flash type unit containing lamps manufactured from borosilicate glass, the finished lacquer-coated lamp has a diameter of about 0.285 inch, a length of about 1 1/32 inches, and an internal volume of about 0.35 cc. Each lamp contains an oxygen fill pressure of 950 cm. Hg. (12.5 atmospheres) and a sufficient quantity of shredded zirconium, as the combustible metal fill, to obtain a specified light output when used in a prior art reflector, which is most efficient for this lamp size. This reflector has an aperture width of about 0.750 inch and a height of about one inch.

A substantial reduction in the cost of the aforementioned flip flash unit can be achieved by the use of lamps having envelopes formed of less expensive soft glass compositions. To maintain output and safety requirements, however, the envelope size of the soft glass lamp must be larger than that of the corresponding hard glass lamp. Copending application Ser. No. 823,794, filed Sept. 1, 1977, and assigned to the present assignee, describes an improved lamp reflector module which permits the use of larger soft glass lamps in a flip flash package having the same exterior dimensions as the previous hard glass type.

Even when using soft glass lamps, however, the cost per flash of a flip flash unit continues to be relatively high when compared to flashcube and magicube photoflash units. An approach toward further reducing the cost per flash is to provide additional soft glass lamps in the same package volume while maintaining performance requirements. A particularly convenient number of lamps for a flip flash unit would be ten, since many of the applicable types of film packs are provided with ten or twenty-frames. To arrange ten lamps and reflectors in a housing which had previously accommodated a compact planar array of eight lamps poses a significant problem.

SUMMARY OF THE INVENTION

Accordingly, it is an object of the present invention to provide an improved multilamp photoflash unit which more efficiently utilizes a given housing volume and thereby reduces the cost of the unit per flashlamp contained therein.

A principal object of the invention is to provide a compact photoflash unit containing more lamps in a given volume while maintaining light output.

A further object is to provide a more efficient arrangement of a planar array of lamps and reflectors.

These and other objects, advantages and features are attained, in accordance with the invention, by providing a planar array of two parallel columns of horizontally disposed lamps, the lamps of one column being staggered relative to the lamps of the other column with the bases interdigitated and facing the adjacent column. A multiple reflector system for the lamps comprises a pair of adjacent strip-like reflector panels each having a column of side-by-side reflector cavities aligned with an associated column of lamps, the cavities of one panel being staggered with respect to the cavities of the other panel. Each panel is foreshortened with respect to the lamps associated therewith but covers the lead-in wires and substantial portions of the bases of lamps associated with the adjacent reflector panel. In this manner, the lead-in wires and base portions of lamps associated with one panel underlie the adjacent panel to be hidden thereby.

According to a preferred embodiment, each of the individual reflector cavities of a panel has a substantially circular aperture with a segment removed along the edge of the panel facing the adjacent panel. Further, each panel has a plurality of arcuate cut-outs located between the apertures along the edge facing the adjacent panel. These cut-outs are aligned with the reflector cavities of the adjacent panel for exposing light-emitting portions of the lamps adjacent to the covered bases thereof. As a consequence, maximum effective reflector surfaces are provided while exposing only the light emitting portions of the lamps, spaces for the lead-wires and bases being provided behind the effective reflecting surfaces. The unique staggered and interdigitated arrangement provides a significant reduction in the width of an elongated array of two columns of lamp-reflector modules while maximizing the light-output obtainable from each module.

BRIEF DESCRIPTION OF THE DRAWINGS

This invention will be more fully described hereinafter in conjunction with the accompanying drawings, in which.

DESCRIPTION OF PREFERRED EMBODIMENT

Figures 1, 2:
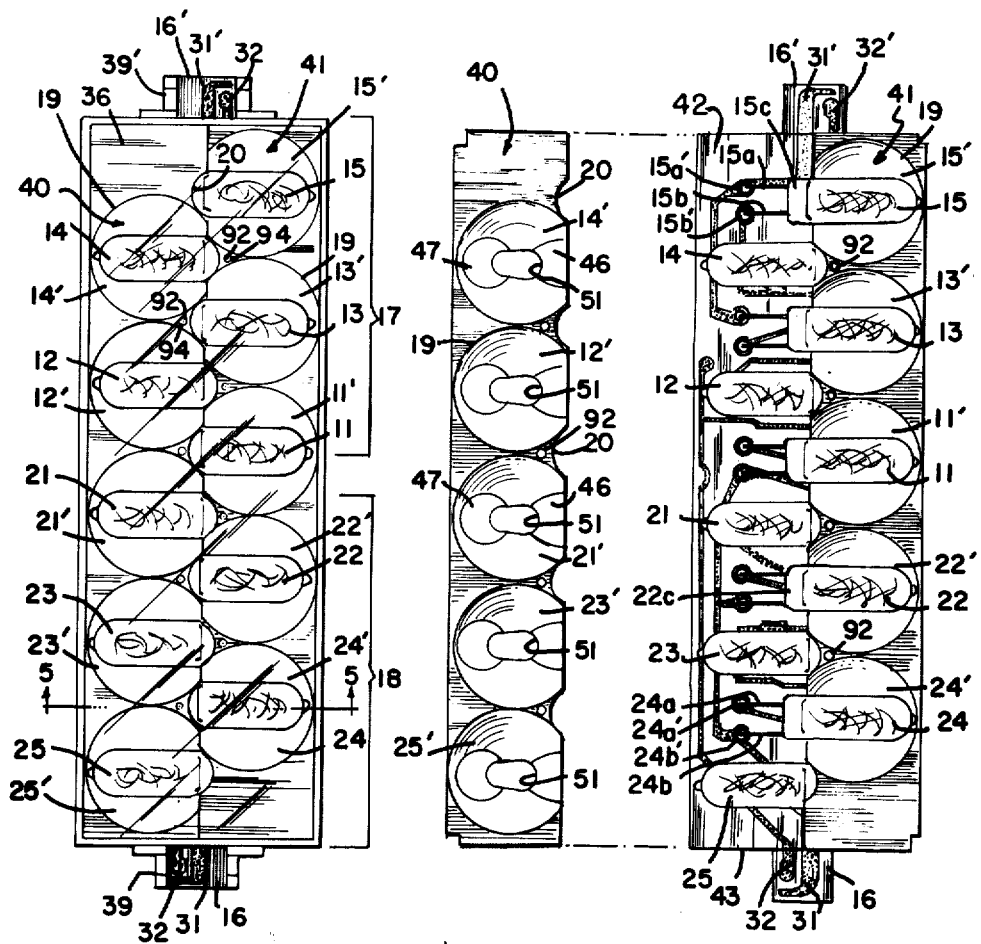
FIG. 1 is a front elevation of a multilamp photoflash unit in accordance with the invention.
FIG. 2 is a front elevation of the unit of FIG. 1 with the cover removed and one of the reflector panels separated and spaced to the side.

FIGS. 1 and 2 illustrate portions of a multilamp photoflash unit similar in general operation to that described in the aforementioned U.S. Pat. No. 4,017,728, except that the construction has been modified, in accordance with the invention, to include additional lamps in a housing having the same outer dimensions. Whereas the unit described in the above-mentioned patent included a planar array of eight high voltage type flashlamps (two groups of four) with associated reflector cavities provided in a single reflector member, the present unit comprises a planar array of ten flashlamps 11-15 and 21-25 mounted on a printed circuit board 43, with an array of respectively associated reflector cavities 11'-15' and 21'-25' disposed therebetween. Further, as will be described in detail, the lamps are mounted in two parallel columns, and the reflector cavities are provided on a pair of strip-like panels 40 and 41 which are conveniently separable for assembly purposes. The array is provided with a plug-in connector tab 16 at the lower end thereof which is adapted to fit into a camera or flash adaptor. A second plug-in connector tab 16' is provided at the top of the unit, whereby the array is adapted to be attached to the camera socket in either of two orientations, i.e., with either the tab 16 or the tab 16' plugged into the socket. the lamps are arranged in two groups of five disposed on the upper and lower halves respectively, of the elongated, rectangular-shaped array. Upper group 17 comprises lamps 11-15, and lower group 18 includes lamps 21-25; the reflector cavities 11', etc. are disposed behind the respective lamps so that as each lamp is flashed, light is projected forwardly of the array. The lamps are arranged and connected so that when the array is connected to a camera by the connector tab 16 only the upper group 17 of lamps will be flashed, and when the array is turned end for end and connected to the camera by the other connector tab 16', only the then upper group 18 of lamps will be flashed. By this arrangement, only lamps relatively far from the camera lens axis are flashable, thus reducing the undesirable red-eye effect.

The construction of the array comprises front and back housing members 36 and 37, (see FIGS. 1 and 5) which preferably are made of plastic and are provided with interlocking members (not shown) which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 16 and 16' and also function to facilitate mechanical attachment to the camera socket. Sandwiched between the front and back housing members 36 and 37, in the order named, are the flashlamps 11, etc., the pair of adjacent strip-like reflector panels 40 and 41 (preferably each being an aluminum-coated plastic molding) shaped to provide the individual reflector cavities 11' etc., a transparent electrically insulating sheet 42, the printed circuit board 43 provided with integral connector tabs 16 and 16', and an indicia sheet 44 (denoted only in FIG. 5) which may be provided with information and trademarks, and other indicia such as flash indicators located behind the respective lamps and which change color due to heat and/or light radiation from a flashing lamp, thus indicating at a glance which of the lamps have been flashed and not flashed.

Referring to FIG. 2, window means, such as openings 51, are provided in each of the reflector cavities 11', etc., behind the lamp aligned therewith. The circuit board 43 is provided with corresponding openings (not shown) to facilitate radiation from the flashlamps reaching the flash indicators. The rear housing member 37 is transparent (either of clear material or provided with window openings) to permit viewing of the indicia on the indicia sheet. The front housing member 36 is transparent, at least in front of the lamps 11, etc., to permit light from the flashing lamps to emerge forwardly of the array and may be tinted to alter the color of the light from the flashlamps.

The height and width of the rectangular array are substantially greater than its thickness, and the height and width of the reflector panels 40, 41, insulating sheet 42, and circuit board 43 are substantially the same as the interior height and width of the housing member 36 to facilitate holding the parts in place.

The tab 16, which is integral with the circuit board 43, is provided with a pair of electrical terminals 31 and 32, and similarly the tab 16' is provided with a pair of terminals 31' and 32', for contacting terminals of a camera socket for applying firing voltage pulses to the array. The terminals 31 and 31' are shown as having a J-shaped configuration for temporarily shorting the socket terminals while the array is being plugged in, to discharge any residual voltage charge in the firing pulse source and also to reduce the likelihood of lamps being accidentally flashed by electrostatic voltage when the array is handled.

Figure 3:
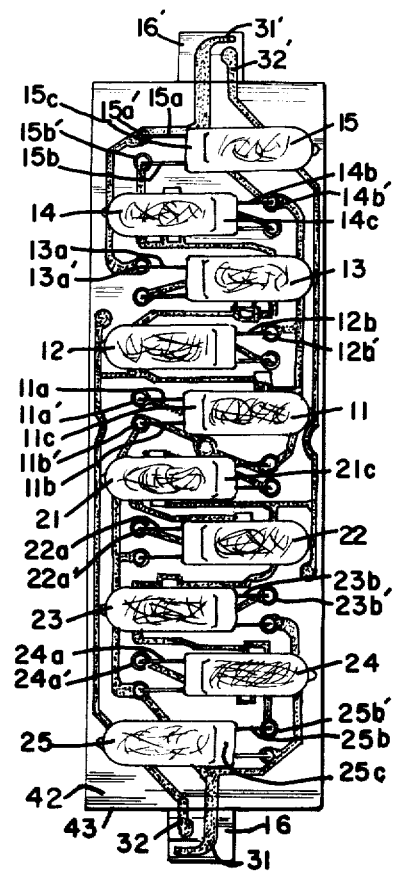
FIG. 3 is a front elevation of the unit of FIG. 1 with the cover and reflectors removed to show the arrangement of lamps mounted on a printed circuit board.

Referring to FIG. 3, the circuit board 43 has a "printed circuit" thereon for causing sequential flashing of the lamps by firing voltage pulses applied to the terminals 31, 32 or 31', 32'. The printed circuit may be functionally similar to that described in the aforementioned U.S. Pat. Nos. 3,894,226 or 4,017,728 except for extending the circuitry to accommodate an additional lamp in each half of the printed circuit board. The top and bottom halves of the printed circuitry preferably are reverse mirror images of each other. The lead wires 11a, 11b, etc., of the lamps 11 etc., may be attached to the circuit board 43 in various ways such as by means of metal eyelets 11a', 11b', etc., placed through openings in the board. The lead wires 11a, 11b, etc., underlie the reflector panels and pass through suitable openings (not shown) in the insulating sheet 42 and into or through the respective pairs of eyelets 11a', 11b', etc. The ends of the eyelets are crimped or bent to hold the lead wires and make electrical contact thereto and also to hold the eyelets in place with their heads in electrical contact with the circuit of the circuit board.

As further described in U.S. Pat. Nos. 3,894,226 and 4,017,728, the circuitry on circuit board 43 includes radiation switches which are in contact with and bridge across circuit runs that are connected to them. The material for the radiation switches may be suitable material initially having an open circuit or high resistance, the resistance thereof becoming zero or of a low value when the material receives radiation in the form of heat and/or light from a respective adjacent lamp upon the lamp being flashed. For this purpose, each of the radiation switches is respectively positioned behind and near to a flashlamp 11, 12, 13, 14. Window means in the form of transparent sections or the illustrated openings 51 are provided in the reflector cavities in front of the switches to facilitate radiation transfer. Accordingly, as illustrated, the openings 51 are somewhat elongated to accommodate radiation transfer for both the indicators and switches. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the circuit on the upper part of the circuit board. The circuit runs from the plugged-in terminals at the lower part of the circuit board and extends upwardly so as to activate the circuitry in the upper half of the circuit board. Similarly, when the unit is turned around and tab 16' is plugged into a socket, the circuit board terminals will be connected to and activate the lamps which will then be in the upper half of the circuit board, and hence in the upper half of the flash unit. This accomplishes, as has been stated, the desirable characteristic whereby only the group of lamps relatively farthest away from the camera lens axis will be flashed, thereby reducing the undesirable "red-eye" effect.

In a manner generally similar to that described in the aforementioned flip-flash patents, the array functions as follows. Assuming that none of the five lamps in the upper half of the unit have been flashed, upon occurrence of the first firing pulse applied across the terminals 31 and 32, this pulse will be directly applied to the lead-in wires of the first connected flashlamp 11, whereupon the lamp 11 flashes and becomes an open circuit between its lead-in wires. Heat and/or light radiation from the flashing first lamp 11 causes the adjacent first radiation switch to become a closed circuit (or a low value of resistance), thereby connecting the circuit board terminal electrically to a lead-in wire of the second lamp 12. By the time this occurs, the firing pulse has diminished to a value insufficient to cause the second lamp 12 to flash. When the next firing pulse occurs, it is applied to the lead-in wires of the second lamp 12 via the now closed radiation switch, whereupon the second lamp 12 flashes, thereby causing an adjacent second radiation switch to assume zero or low resistance, and the second lamp 12 now has an open circuit or high resistance between its lead-in wires. When the next firing pulse occurs, it is applied via the now closed second radiation switch to the third lamp 13, thereby firing the lamp which becomes an open circuit, and the radiation from it causes an adjacent third radiation switch to become essentially a closed circuit across its terminals. Thus, the next firing pulse will be applied via the now closed third-radiation switch to the lead-in wires of the fourth flashlamp 14, thereupon causing that lamp to flash. The fourth lamp then becomes an open circuit, and the radiation from it causes an adjacent fourth radiation switch to become essentially a closed circuit across its terminals. The next (fifth) firing pulse will be applied via the now closed fourth radiation switch to the lead-in wires of the fifth flashlamp 15, thereupon causing the last lamp of the group 17 to flash. When the flash unit is turned around and the other connector tab 16' attached to the camera socket, the group 18 of lamps that then become uppermost and relatively farthest away from the lens axis will be in the active circuit and will be flashed in the same manner as has been described. In a preferred embodiment, the lamps 11, etc., are high voltage types requiring about 2,000 volts, for example, at low current for flashing, and they can be fired by impacting or stressing a piezoelectric element in the camera.

In accordance with the present invention, a unique arrangement of the reflectors and lamps is provided which more efficiently utilizes a given housing volume and permits additional lamps to be accommodated in a given package volume while maintaining light output performance requirements. More specifically, the lamp-reflector configuration of the invention enables a very significant reduction in the cost of the photoflash unit per flashlamp contained therein. For example, a typical prior art flip flash unit employed eight tubular lamps which were vertically disposed and arranged in a pair of aligned parallel columns of four lamps each. The parameters of the typical borosilicate hard glass lamps employed in such units is described hereinbefore. With respect to the improved unit described in the aforementioned copending application Ser. No. 823,794 which employs eight soft glass lamps in the same array configuration, the parameters of each lamp are: a tubular envelope of type 0010 or 0012 glass having a thickness of about 32 mils; a diameter of about 0.325 inch for the finished coated lamp; a length of about 1 1/32 inches; an internal volume of about 0.5 cc; an oxygen pressure of about 675 cm. Hg. (8.8 atmospheres); and a fill of 14 mgs. of shredded zirconium.

For comparison, the following are the parameters of a soft glass flashlamp accommodated by a ten-lamp configuration according to one embodiment of the present invention: a tubular envelope of type 0010 or 0012 glass having a thickness of about 32 mils; a diameter of about 0.325 inch for the finished coated lamp; a length of about 0.925 inch (thus slightly shorter than the prior art lamps); an internal volume of about 0.4 cc (a figure between the internal volumes given for the previously mentioned hard and soft glass lamps); an oxygen pressure of 725 cm. Hg (9.5 atmospheres), which is slightly higher than the previous soft glass lamp but substantially less than the previous hard glass lamp; and a shredded zirconium fill of about 14 mgs.

The typical unit package dimensions within which the previously mentioned 8-lamp arrays were housed and within which the present ten-lamp array is housed are as follows. The width of housing 36, 37 is about 1⅞ inches; the thickness is about 9/16 inch; and the overall length (not including the extensions 39 and 39') is about 4 15/16 inches; and the length including the extensions is about 5 15/32 inches.

In the lamp configuration according to the invention, referring particularly to FIG. 3, the planar array of ten tubular photoflash lamps 11-15 and 21-25 are arranged in two parallel columns with the lamps horizontally disposed and the lamps of one column staggered relative to the lamps of the other column. Each of the lamps have a base defined by a pinch seal (11c-15c and 21c-25c) from which the lead-in wires 11a and 11b, etc., emerge and are connected to the printed circuitry by eyelets, as previously discussed. The column of lamps 15, 13, 11, 22, and 24 are positioned with their respective bases interdigitated with the bases of the adjacent column comprising lamps 14, 12, 21, 23, and 25. In this manner, the bases of one column of lamps face the adjacent column of lamps. It is evident that this arrangement of staggered interdigitation has the effect of compacting the width of the array. Of course, this mode of compacting the array could have been accomplished by arranging the adjacent columns of lamps tip-to-tip or base-to-tip. It will now be made clear, however, that the base-to-base configuration, in cooperation with the reflector arrangement described hereinafter, enables a maximization of the light output obtainable from each lamp-reflector module.

As best illustrated in FIGS. 1 and 2, the reflector system comprises a pair of adjacent strip-like reflector panels 40 and 41, each associated with a respective one of the columns of lamps, and each having a column of side-by-side lamp-receiving cavities on its front side formed with reflecting surfaces defining individual lamp reflectors which respectively are aligned behind the lamps associated therewith. More specifically, reflector panel 40 contains the cavities 14', 12', 21', 23' and 25', which are respectively aligned behind the column of lamps 14, 12, 21, 23 and 25. The reflector panel 41 contains cavities 15', 13', 11', 22' and 24', which are respectively aligned behind the column of lamps 15, 13, 11, 22, and 24. The individual reflector cavities of one panel are staggered relative to the individual reflector cavities of the other panel, and each reflector panel is foreshortened with respect to the lamps associated therewith, as particularly illustrated by panel 41 with respect to its associated column of lamps in FIG. 2. More particularly, in this embodiment the reflector cavities each have a substantially circular aperture 19 having a diameter of about 0.868 inch, and the foreshortening of the reflector panel results in a segment of this aperture being removed along the edge of the panel facing the adjacent reflector panel such that the width of the reflector panel is about 0.773 inch at the aperture plane. In this manner, as shown in FIG. 2, the base portions of the lamps, such as 15c, tend to project beyond the edge of the associated reflector panel. Accordingly, when adjacent reflector panel 40 is assembled in abutment with panel 41, panel 40 covers the lead-in wires and substantial portions of the bases of the lamps associated with panel 41. Hence, with respect to all lamps of the array, the non-light-emitting portions of the lamps are covered by reflector panel surfaces. More specifically, the lead-in wires and base portions of all lamps associated with panel 41 underlie the adjacent panel 40 to be hidden thereby, and the lead-in wires and bases of the lamps associated with panel 40 underlie adjacent panel 41 to be hidden thereby.

In order to assure yet additional maximization of light output, the reflector panels, as illustrated, may also have a plurality of cut-outs 20 located along the edge thereof facing the adjacent panel and respectively aligned with the individual reflector cavities of that adjacent panel for exposing light-emitting portions of the lamps adjacent to the covered bases thereof. More specifically, the cut-outs 20 along the edge of each panel comprise arcuate recesses between the circular apertures 19.

Figure 5:
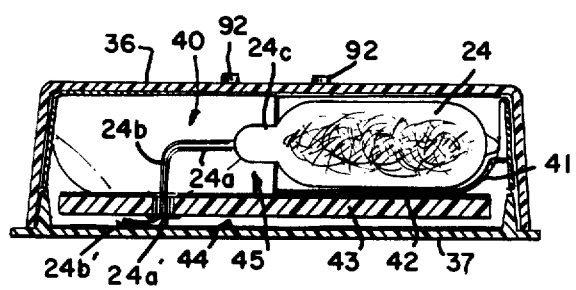
FIG. 5 is an enlarged cross-sectional view taken along line 5—5 of FIG. 1.
Figure 4:
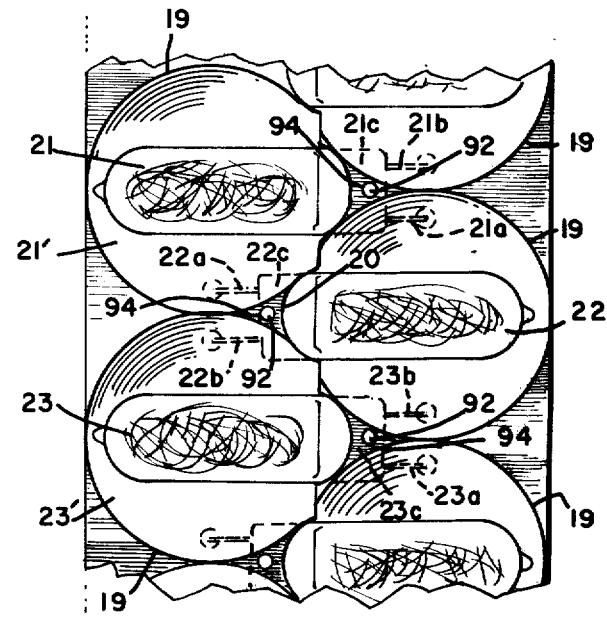
FIG. 4 is an enlarged fragmentary view of a portion of the photoflash unit of FIG. 1 particularly illustrating the location of the lamps and lamp bases with respect to the two reflector panels.
Figure 6:
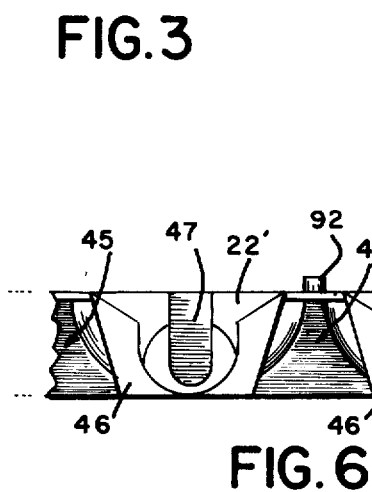
FIG. 6 is an enlarged fragmentary detail view of a portion of a reflector panel, as viewed from the lamp-receiving edge, particularly showing the space provided between reflector cavities on the back side of the panel.

As illustrated, the circular apertures 19 of each column of side-by-side reflector cavities on the front side of the panel abut with the aperture to its side. Referring particularly to FIGS. 5 and 6, this arrangement of side-by-side cavities with circular apertures results in spaces 45 between cavities on the back side of a panel. Accordingly, as illustrated by FIGS. 4 and 5, the lead-in wires and base portions of lamps associated with one panel which underlie the adjacent panel fits within these spaces between cavities on the back side of the adjacent panel and, thus, are positioned between that adjacent panel and the circuit board. As a result, the pinch seals 11c etc., and lead-in wires 11a, and 11b, etc., are located under active reflector surfaces associated with the adjacent column of lamps, and a configuration is provided wherein only the active, or functional, portion of each lamp is visible to the user. The net result is a more efficient method of assembling lamps and better utilizing the components of the array assembly to maintain a desired level of light output performance.

In the specific embodiment illustrated, the reflector surface of each cavity basically comprises a paraboloid of revolution with a skirt 46 at the foreshortened end (see FIGS. 2 and 6) and a dome dimple 47 at the other end of the reflector for accommodating the tipped off end of the lamp. The illustrated reflector panels 40 and 41 also are provided with conductive projections 92 which are disposed on the front face of each panel between the circular apertures and adjacent the arcuate recesses 20. The projections 92 fit through openings 94 in the front face of housing member 36. As each reflector panel has a conductive metallic coating over its entire front surface which may be connected, such as by a wire (not shown), to the ground circuit including terminals 31 and 31', the projections 92 provide static grounding protection for the unit by assuring electrical contact with any charged object, such as a user's hand, which may touch the front of the array housing. A basic arrangement of this type is described in copending application Ser. No. 724,792, filed Sept. 20, 1976 and assigned to the present assignee.

Although the present invention has been described with respect to specific embodiments, it will be appreciated that modifications and changes may be made by those skilled in the art without departing from the true spirit and scope of the invention.

What we claim is:

1. A multilamp photoflash unit of elongated shape comprising in combination: circuit means for connecting firing pulses to the lamps of said unit; two parallel columns of horizontally disposed tubular photoflash lamps arranged in a planar array and having respective bases from which lead-in wires energe and are connected to said circuit means, the lamps of one column being staggered relative to the lamps of the other column with the bases interdigitated and facing the adjacent column; and a multiple reflector system comprising a pair of adjacent strip-like reflector panels each associated with a respective one of said columns of lamps and having a column of side-by-side lamp-receiving cavities on its front side formed with reflecting surfaces defining individual lamp reflectors which respectively are aligned behind the lamps associated therewith, the individual reflector cavities of one panel being staggered relative to the individual reflector cavities of the other panel, and each reflector panel being foreshortened with respect to the lamps associated therewith but covering the lead-in wires and substantial portions of the bases of lamps associated with the adjacent reflector panel, whereby the lead-in wires and base portions associated with one panel underlie the adjacent panel to be hidden thereby.

2. The photoflash unit of claim 1 wherein each of said reflector panels has a plurality of cut-outs located along the edge thereof facing the adjacent panel and respectively aligned with the individual reflector cavities of said adjacent panel for exposing light-emitting portions of said lamps adjacent to the covered bases thereof.

3. The photoflash unit of claim 2 wherein in each of the individual reflector cavities of a panel has a substantially circular aperture with a segment removed along the edge of the panel facing the adjacent panel, and said cut-outs along the edge of a panel comprise arcuate recesses between said apertures.

4. The photoflash unit of claim 3 wherein each of said circular apertures of the column of side-by-side reflector cavities on the front side of a panel abuts with the aperture to its side, said side-by-side cavities with circular apertures result in spaces therebetween on the back side of a panel, and the lead-in wires and base portions of lamps associated with one panel which underlie the adjacent panel fit in said spaces between cavities on the back side of said adjacent panel.

5. The photoflash unit of claim 1 wherein said circuit means comprises a printed circuit board having lamp firing circuitry on a surface thereof, said lamps are positioned over said surface and the lead-in wires of the lamps are connected to said circuitry, the longitudinal axes of said tubular lamps are substantially parallel to said circuit board, the cavities of said reflector panels are positioned between said lamps and said circuit board, and the lead-in wires and base portions of lamps associated with one reflector panel are positioned between the adjacent reflector panel and said circuit board.

6. The photoflash unit of claim 5 wherein each of the apertures of the column of side-by-side reflector cavities on the front side of a panel abut with the aperture to its side, said side-by-side cavities result in spaces therebetween on the back side of a panel, and the lead-in wires and base portions of lamps associated with one panel which underlie the adjacent panel fit in said spaces between cavities on the back side of said adjacent panel.

7. The photoflash unit of claim 6 wherein the base of each of said lamps comprises a pinch seal.

8. The photoflash unit of claim 5 wherein each of said reflector cavities is provided with a window means behind the lamp aligned therewith.

* * * * *